(12) United States Patent
McPhillips (10) Patent No.: US 9,506,636 B2
(45) Date of Patent: Nov. 29, 2016

(54) LIGHTED DISPLAY CONNECTOR

(71) Applicant: Atomic Design Inc., Lititz, PA (US)

(72) Inventor: Thomas McPhillips, Manheim, PA (US)

(73) Assignee: Atomic Design Inc., Lititz, PA (US)

( * ) Notice: Subject to any disclaimer, the term of this patent is extended or adjusted under 35 U.S.C. 154(b) by 0 days.

(21) Appl. No.: 14/282,727

(22) Filed: May 20, 2014

(65) Prior Publication Data

US 2015/0338070 A1 Nov. 26, 2015

(51) Int. Cl.
| | | |
|---|---|---|
| *F21V 21/002* | (2006.01) | |
| *F21V 21/02* | (2006.01) | |
| *F21V 33/00* | (2006.01) | |
| *G09F 13/02* | (2006.01) | |
| *F21V 21/00* | (2006.01) | |
| *F21Y 101/02* | (2006.01) | |
| *G09F 13/22* | (2006.01) | |
| *F16B 2/04* | (2006.01) | |
| *F16B 2/18* | (2006.01) | |
| *F16B 5/06* | (2006.01) | |
| *F21Y 101/00* | (2016.01) | |

(52) U.S. Cl.
CPC ............ *F21V 21/02* (2013.01); *F21V 33/00* (2013.01); *G09F 13/02* (2013.01); *F16B 2/04* (2013.01); *F16B 2/185* (2013.01); *F16B 5/0642* (2013.01); *F21Y 2101/00* (2013.01); *F21Y 2101/02* (2013.01); *G09F 2013/222* (2013.01)

(58) Field of Classification Search
CPC ............ F21S 2/00–2/005; F21S 4/00–4/002; F21W 2131/406
See application file for complete search history.

(56) References Cited

U.S. PATENT DOCUMENTS

| | | | |
|---|---|---|---|
| 1,525,515 | A | 2/1925 | Socha |
| 2,692,689 | A | 10/1954 | Wynne, Sr. |
| 2,970,396 | A | 2/1961 | Worrell |
| 3,192,820 | A | 7/1965 | Pitzer |
| 3,426,913 | A | 2/1969 | Abatiell, Jr. |
| 3,537,199 | A | 11/1970 | Lawson |
| 3,571,999 | A | 3/1971 | Downing |
| 3,593,474 | A | 7/1971 | Neels |
| 3,596,701 | A | 8/1971 | Cowan |
| 3,936,111 | A | 2/1976 | Mazzucconi |
| 4,001,987 | A | 1/1977 | Coulthard |
| 4,114,160 | A | 9/1978 | Verini |
| 4,807,837 | A | 2/1989 | Gawlik et al. |

(Continued)

FOREIGN PATENT DOCUMENTS

| | | |
|---|---|---|
| AU | 2012261483 A1 | 6/2013 |
| CA | 1263233 A1 | 11/1989 |

(Continued)

OTHER PUBLICATIONS

Installation Instructions for Pillow Wall, by Atomic, (877-626-8301), 1 page.

(Continued)

*Primary Examiner* — Ahn Mai
*Assistant Examiner* — Nathaniel Lee
(74) *Attorney, Agent, or Firm* — Barley Snyder (57) ABSTRACT

A display connector is provided and includes a plate body, a display assembly, and a power source. The plate body includes a panel fastener, and the display assembly is positioned on the plate body. The display assembly includes a light source, with the power source connecting to the light source through the plate body.

23 Claims, 8 Drawing Sheets

(56) References Cited

U.S. PATENT DOCUMENTS

| | | | |
|---|---|---|---|
| D307,448 S | 4/1990 | Akard | |
| 5,036,641 A | 8/1991 | Viry | |
| 5,061,018 A | 10/1991 | Pederson et al. | |
| 5,344,115 A | 9/1994 | Mayne et al. | |
| 5,478,041 A | 12/1995 | Mayne | |
| 5,590,921 A | 1/1997 | Holtman et al. | |
| 5,671,852 A | 9/1997 | Maharg | |
| 5,722,477 A | 3/1998 | Richter et al. | |
| 5,947,356 A | 9/1999 | Delong | |
| 5,993,287 A | 11/1999 | Melashenko et al. | |
| 6,340,046 B1 | 1/2002 | Basseches | |
| 6,370,803 B1 | 4/2002 | Burquest | |
| 6,419,332 B1 | 7/2002 | Caldwell, Jr. et al. | |
| 6,702,640 B1 | 3/2004 | Park | |
| 6,718,709 B2 | 4/2004 | Koutras et al. | |
| 6,983,853 B1 | 1/2006 | Fickett | |
| D515,252 S | 2/2006 | Dumbrell | |
| D562,113 S | 2/2008 | Ciungan et al. | |
| D618,282 S | 6/2010 | Kosir | |
| D624,461 S | 9/2010 | Noble et al. | |
| 7,874,090 B2 | 1/2011 | Flagg | |
| D634,745 S | 3/2011 | Park et al. | |
| 8,069,632 B2 | 12/2011 | Li | |
| 8,083,189 B2 | 12/2011 | Sun et al. | |
| D708,504 S | 7/2014 | Kaplan | |
| D709,203 S | 7/2014 | Shikata | |
| D736,858 S | 8/2015 | McPhillips | |
| 2002/0036908 A1 | 3/2002 | Pederson | |
| 2002/0154789 A1 | 10/2002 | Rodgers | |
| 2003/0000904 A1 | 1/2003 | Lung et al. | |
| 2003/0192271 A1 | 10/2003 | Koutras et al. | |
| 2004/0035987 A1 | 2/2004 | Oddsen, Jr. | |
| 2004/0089782 A1 | 5/2004 | Eliason et al. | |
| 2005/0007031 A1* | 1/2005 | Hyder | F21S 2/005 315/276 |
| 2007/0107853 A1 | 5/2007 | Hsieh | |
| 2009/0134285 A1 | 5/2009 | Huang | |
| 2009/0196034 A1* | 8/2009 | Gherardini | F21K 9/00 362/235 |
| 2012/0169999 A1* | 7/2012 | Cavendish | G03B 21/585 353/10 |
| 2014/0047747 A1 | 2/2014 | Jackson | |
| 2014/0183309 A1 | 7/2014 | Pasho | |
| 2014/0197123 A1 | 7/2014 | McPhillips | |

FOREIGN PATENT DOCUMENTS

| | | |
|---|---|---|
| DE | 8517546 U1 | 1/1985 |
| DE | 29820223 U1 | 2/1999 |
| DE | 10138986 A | 3/2003 |
| DE | 102011015351 A1 | 10/2012 |
| EP | 1995508 A2 | 11/2008 |
| FR | 2851442 A1 | 2/2003 |

OTHER PUBLICATIONS

PCT Notification, International Search Report and Written Opinion, International Application No. PCT/US2014/011055, dated Jun. 2, 2014, 10 pages.
PCT Notification, International Search Report and Written Opinion, International App. No. PCT/US2015/031782, dated Aug. 14, 2015, 11 pages.
PCT Notification of Transmittal of International Preliminary Report on Patentability, International Application No. PCT/US2014/061074, dated Apr. 28, 2016, 1 page.
Attachment 1, Installation Instructions, Swell Latch Installation Instructions, Innovative Components, dated Jun. 16, 2009, 1 page.
PCT International Preliminary Report on Patentability, International Application No. PCT/US2014/061074, dated Apr. 19, 2016, 7 pages.
PCT Notification, International Preliminary Report on Patentability, dated Jul. 23, 2015, 7 pages.
PCT international Search Report, dated Feb. 25, 2015, 12 pages.

* cited by examiner

LIGHTED DISPLAY CONNECTOR

FIELD OF THE INVENTION

The invention relates to a display connector and, more particularly, to a display connector for connecting a plurality of modular units.

BACKGROUND

Decorative modular displays are commonly used in stage and set design. Generally, modular units are hung from a hanging frame using backdrop technology and separate lighting is used to illuminate the display. A known modular display system may use a truss or theatre fly-system pipes to hang modular panels that clip together using rings or hooks to form a backdrop, which results is a decorative surface that is aesthetic while also increasing the range of available lighting effects. Separate lighting assemblies are constructed and positioned to illuminate the display structure or create further visual effects on or around the modular display.

Construction of these known display systems with a separate lighting assembly can be expensive and require tedious labor in assembly. Additional problems with these known display systems involve connection between adjacent modular units and methods for controlling a gap between connecting adjacent modular units. Furthermore, each modular unit in the known display system is either permanently attached to the adjacent modular unit or requires a complex rigid connection system, which restricts replacement of each modular unit and/or the entire system. It has been long desired to have a connector for modular display system seamless connect modular panels of a backdrop which includes an integrated lighting assembly.

SUMMARY

Therefore, the invention relates to a display connector having a plate body, a display assembly, and a power source. The plate body includes a panel fastener, and the display assembly is positioned on the plate body. The display assembly includes a light source, with the power source connecting to the light source through the plate body.

BRIEF DESCRIPTION OF THE DRAWINGS

The invention will be explained in greater detail in the following with reference to embodiments, referring to the appended drawings, in which.

DETAILED DESCRIPTION OF THE EMBODIMENT(S)

Embodiments of the invention will now be described in greater detail with reference to the drawings.

Referring first to FIGS. 1-4, a display connector 1 according to an embodiment of the invention is shown and includes the following major components: a plate body 10, a plurality of fasteners 20, a display assembly 30, and a power source 100.

In an exemplary embodiment, the connector 1 is a plastic article, but could be prepared from other known materials available to one skilled in the art, including metals, fibrous material, or composites. The plate body 10 is a thin rigid planar member having a smooth flat front surface. The plate body 10 includes a plurality of fastener receiving through holes 12 and a display assembly receiving passageway 14. In the embodiment shown, the plate body 10 is square, but could have polygonal shapes.

The plurality of fastener receiving through holes 12 extend through the plate body 10. In particular, the fastener receiving through holes 12 are positioned adjacent to an outer edge of the plate body 10.

The display assembly receiving passageway 14 is also a through hole that extends through the plate body 10. As shown, the display assembly receiving passageway 14 is disposed about a substantial center section of the plate body 10 in the shown embodiment. However, one skilled in the art should appreciate that the display assembly receiving passageway 14 may be positioned anywhere along the plate body 10.

In the embodiment shown, the display assembly receiving passageway 14 includes engagement wall 16 with a flange 18 positioned along one end of the engagement wall 16. As shown, the engagement wall 16 are the cylindrical inner surface wall of the planar member of the plate body 10. However, one skilled in the art should appreciate that the engagement wall 16 may be formed from other polygonal shapes or include other structural features, such as an attachment mechanism For instance, the display assembly receiving passageway 14 may include a threaded surface or snap connector receiving section disposed along surfaces of the engagement wall 16.

In an alternative embodiment, the plate body 10 may include panel receiving sections (not shown), which are indentations along the flat front surface meant to receive a section of a modular panel (See FIGS. 5 and 6), for a more controlled fit of the modular panel 4 and the connector 10.

As shown in FIGS. 1-6, each fastener 20 is a swell latch having a lever 22 attached to a screw 24, a rubber washer 26, and a nut 28 connectable with the screw 24. The screw 24 is sized and shaped to extend through fastener receiving through holes. The rubber washer 26 is sized to larger fit within the plurality of fastener receiving through holes 12

However, one skilled in the art would appreciate that the fastener 20, in other embodiments, may be any known type of fastener, such a latch, screw, nut and bolt, hook and loop fastener, and removable adhesive. Depending on the fastener 20 used, the fastener receiving through hole 12 may not be necessary. For instance, the modular panel 4 may include a removable adhesive that effectively attaches to the plate body 10 without the need of additional fasteners for the connector 1.

Figure 2:
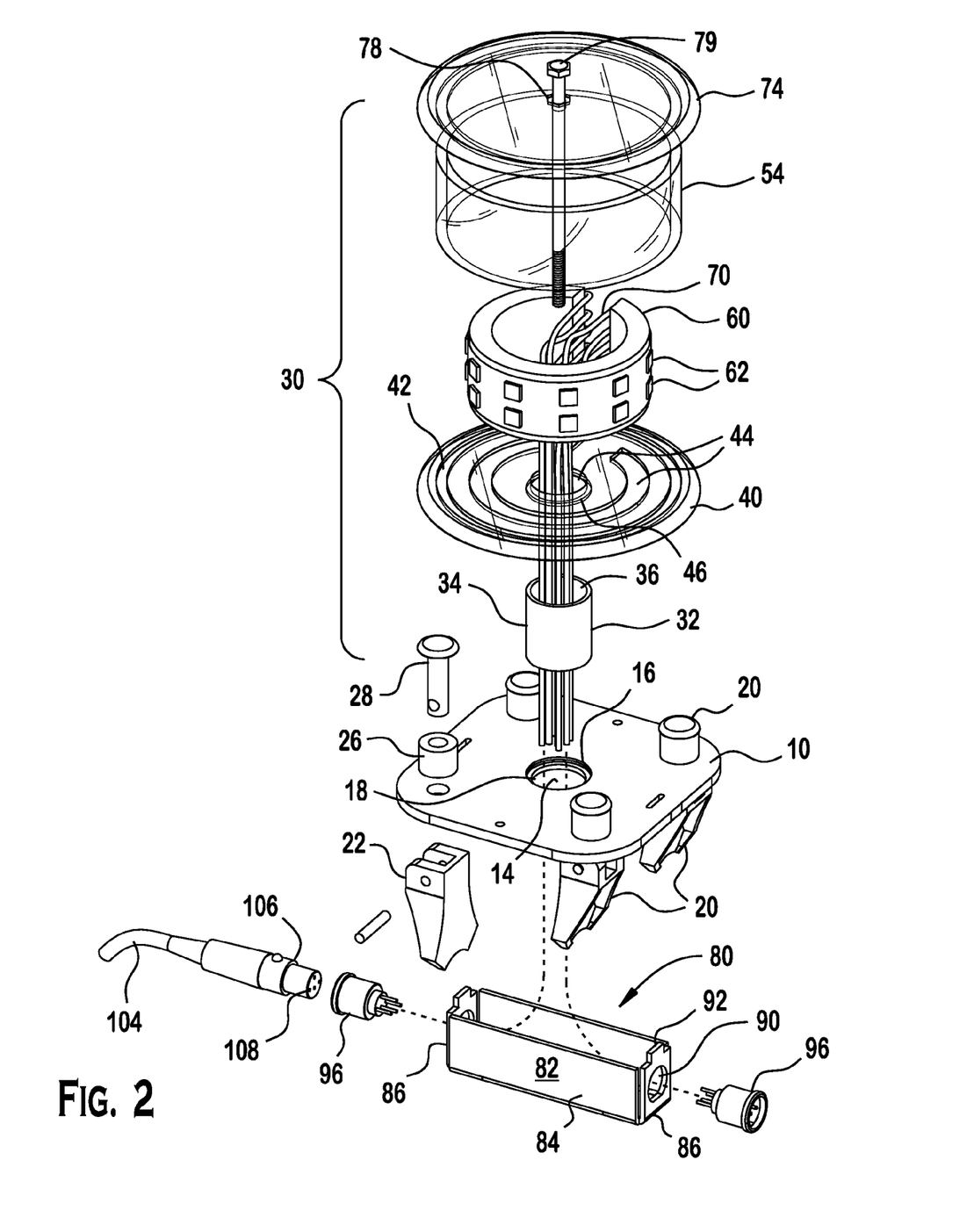
FIG. 2 is an exploded perspective view of the display connector of FIG. 1.

As shown in FIG. 2, an exemplary embodiment of the display assembly 30 is shown and includes an extender 32, a light housing 38, a light source assembly 60, and a lid 74.

As shown, the extender 32 is an elongated body having an extension wall 34 and wire receiving passageway 36 extending there between the extension walls 34. The elongated body has a length that positions the light housing 38 from the plate body 10. In the shown embodiment, the extender 32 is tubular and has a shape matching the size and shape of the display assembly receiving passageway 14. One skilled in the art should appreciate that other shapes and designs are possible. For instance, the length and the number of extension walls may vary.

In another embodiment, the extender 32 may include an attachment mechanism disposed at one or both ends of the extension walls 34. For instance, the extension walls 34 may include a threaded surface or snap connector pieces disposed along surfaces of the extension walls 34 that correspond with the attachment mechanism of the engagement wall 16.

As shown in FIG. 2, the light housing 38 includes a base 40 and a support wall 56.

In the shown embodiment, the base 40 includes a planar member having a disk profile and a chamfered edge. However, one skilled in the art should appreciate that other shapes are possible.

The base 40 includes a support wall receiving section 42 positioned on a top surface of the base 40. The support wall receiving section 42 is a circular notch in the shown embodiment. The support wall receiving section 42 is positioned adjacent the chamfered edge. The support wall receiving section 42 has a width at least equal to a width of the support wall 54.

In the shown embodiment, the base 40 also includes a light source receiving groove 44 positioned on the top surface of the base 40. In the shown embodiment, the light source receiving groove 44 is a circular notch positioned inside the support wall receiving section 42. The light source receiving groove 44 is c-shaped in the shown embodiment. However, one skilled in the art should appreciate other designs and shapes are possible.

The base 40 also includes an extender receiving space 46 is disposed along a bottom surface thereof. Additionally, the extender receiving space 46 is positioned a substantial center of the base 40. The extender receiving space 46 includes an engagement wall 48 and a flange 50 positioned along one end of the engagement wall 48. In the shown embodiment, the engagement wall 48 are the cylindrical inner surface walls of the base 40 extending from the bottom surface thereof. However, one skilled in the art should appreciate that the engagement wall 48 may be shaped into other polygonal shapes or include other structural features, such as an attachment mechanism For instance, the extender receiving space 46 may include a threaded surface or snap connector receiving sections disposed along surfaces of the engagement wall 48 that may engage with the extender 32. The flange 50 extends inward from the engagement wall 48 and forms a wire receiving passageway 52 that extends through the base 40.

As shown in FIG. 2, the support wall 54 is an elongated tubular body made from a translucent or transparent material, such as plastic or glass. The support wall 54 includes a translucent wall 58 and a display assembly receiving space 59 extending there between the translucent walls 58. The display assembly receiving space 59 has diameter large enough to accommodate the light source assembly 60. One skilled in the art should appreciate that other shapes and designs are possible. For instance, the length and the number of translucent walls 58 may vary, and may have a square shape.

In another embodiment, the display assembly receiving space 59 may include an attachment mechanism disposed at one or both ends of the translucent walls 58. For instance, the translucent walls 58 may include a threaded surface or snap connector pieces disposed along surfaces thereof.

Figure 1:
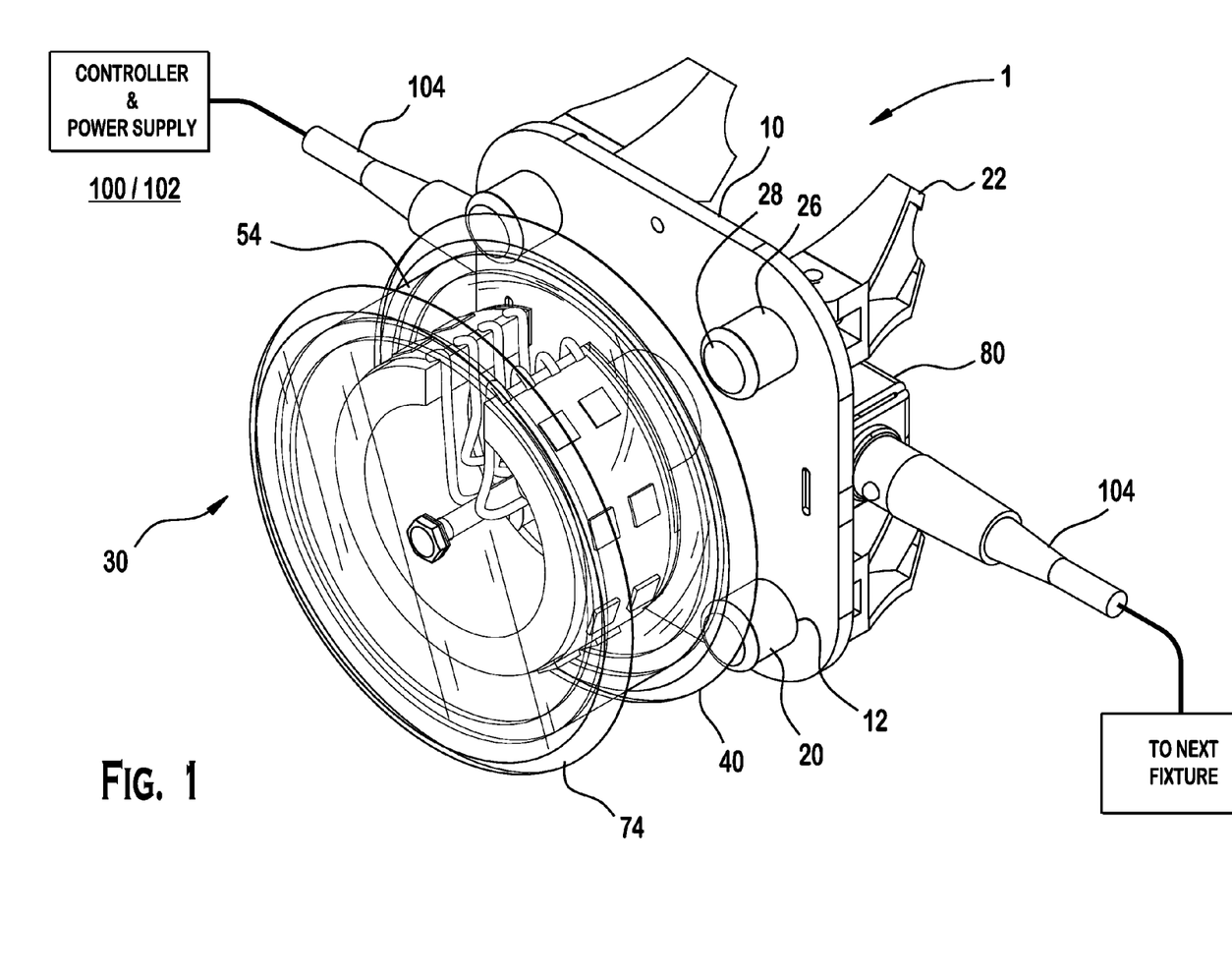
FIG. 1 is a perspective view of a display connector according to the invention.
Figure 3:
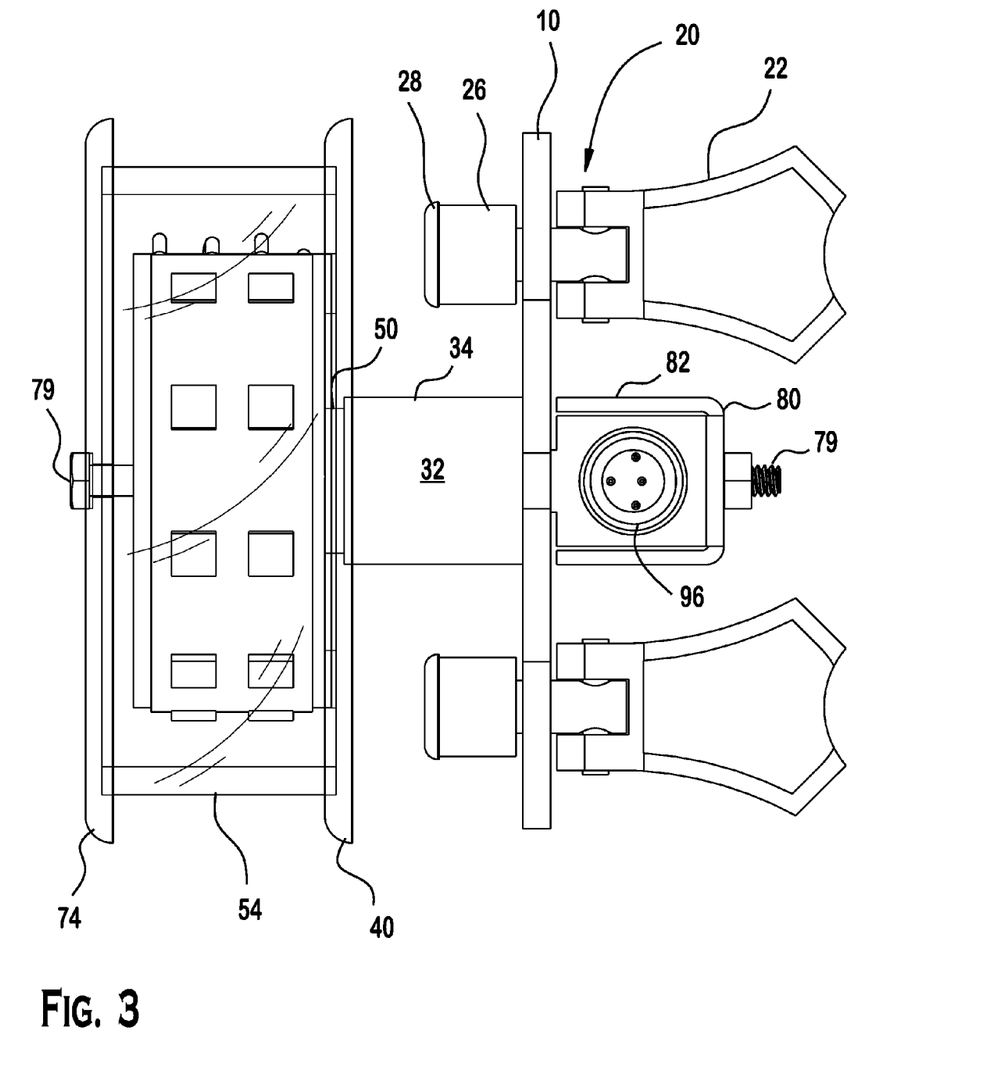
FIG. 3 is a side view of the display connector of FIG. 1.

As shown in FIGS. 1-3, the lid 74 is planar member having a disk shape and a chamfered edge. The lid 74 is sized and shaped similar to the base 40. However, one skilled in the art should appreciate that other shapes are possible.

The lid 74 includes a support wall receiving section 76 positioned on a lower surface of the lid 74. The support wall receiving section 76 is a circular notch in the shown embodiment. The support wall receiving section 76 is positioned adjacent the chamfered edge. The support wall receiving section 76 has width or diameter at least equal to a width or diameter of the support wall 54.

As shown in FIG. 2, a fastener 79 is provided and the lid 74 further includes a fastener receiving passageway 78 extending completely there through. In the shown embodiment, the fastener 79 is nut and bolt assembly. However, one skilled in the art should appreciate that other fastener mechanisms may be used, including snaps, screws, adhesives, clasps and mechanical welds.

Now with reference to FIGS. 1-3, an embodiment of the light source assembly 60 is shown and includes a light source 62 and a mounting wall 64. The light source assembly 60 is a device that produces light from electric power or a waveguide.

The light source 62 in the shown embodiment is an array of light emitting diodes (LEDs). In particular, the light source 62 is a LED tape light. However, one skilled in the art would appreciate other light device may be used, including other electric lights, such as incandescent lamps and gas-discharge lamps. It is also possible that the light source 62 may include a fiber optic assembly.

Figure 4:
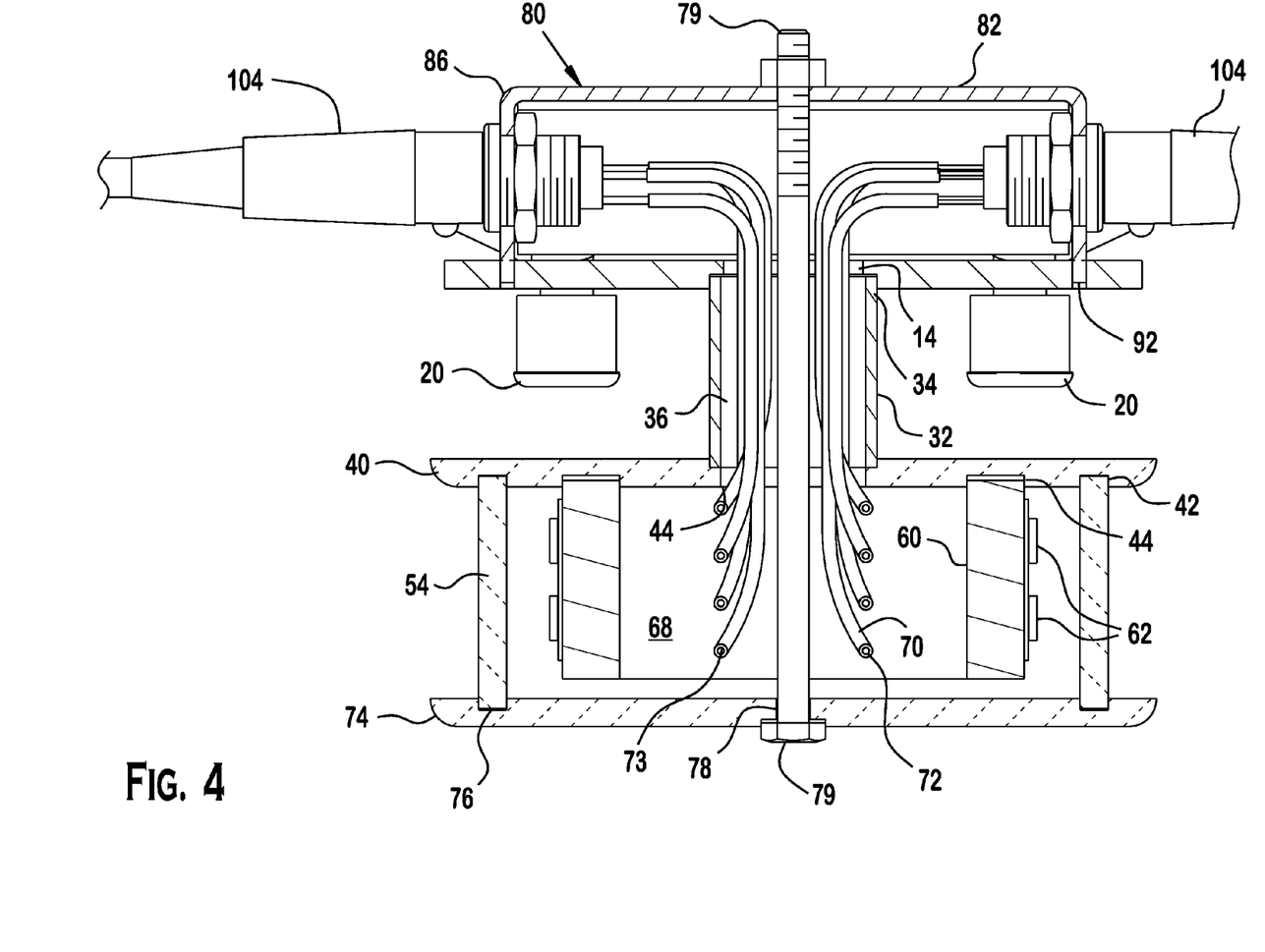
FIG. 4 is a sectional view of the display connector of FIG. 3, taken along line 3-3.

The mounting wall 64 is a tubular member having a wire receiving space 66, as shown in FIG. 4, extending though a middle thereof and a plurality of light source receiving passageways 68 positioned along an outer surface of the mounting wall 64. The light source receiving passageways 68 are notches that extend into the tubular member. Each light source receiving passageway 68 is shaped and sized to receive the light source 62, such as a LED. In the shown embodiment, mounting wall 64 is circular shaped and, in particular, c-shaped.

Depending on the type of light source 62, one or more conductors or optical fibers 70 are provided. In the shown embodiment, a plurality of conductors or optical fibers 70 connect to and extend from the light source 62. The plurality of conductors or optical fibers 70 include a plurality of lead conductors 72 leading into the light source 62 and a plurality of trailing conductors 73 extending away from the light source 62.

As shown in FIGS. 1-4, a power supply assembly 80 is disposed along a lower surface of the plate body 10. In the shown embodiment, the power supply assembly 80 includes a connection box 82 and a plurality of power supply connectors 96.

In the shown embodiment, the connection box 82 is rectangular. The connection box 82 is a rigid structural housing having a protection wall 84, a plurality of support walls 86, a cable receiving space 88, a plurality of connector receiving spaces 90, and an body attachment mechanism 92.

The protection wall 84 is a planar base member from which the plurality of support walls 86 extend. In the shown embodiment, the connection box 82 includes four support walls 86 arranged adjacent to each other in a rectangular shape. However, one skilled in the art should appreciate that other shapes are possible.

The cable receiving space 88 is a hollow receiving space positioned between the support walls 86 and the protection wall 84.

The plurality of connector receiving spaces 90 are through holes leading into the cable receiving space 88. In the shown embodiment, a pair of connector receiving spaces 90 are positioned through opposite support walls 86.

In the shown embodiment, the body attachment mechanism 92 includes a pair of clips 94. Each clip 94 is a cantilevered member extending from the support wall 86, away from the protection wall 84. Each clip 94 is positioned opposite support walls 86 with respect to each other. However, one skilled in the art should appreciate that other know attachment mechanisms are possible, including fasteners, adhesives, and other known retention devices.

The plurality of power supply connectors 96 are plug and/or receptacles having terminals connectable with the plurality of conductors or optical fibers 70. In the shown embodiment, a pair of power supply connectors 96 are receptacles positioned at opposite ends of the connection box 82 and, in particular, in the plurality of connector receiving spaces 90. Each power supply connector 96 includes a terminal 98.

In the shown embodiment, the display connector 1 connects to a power source 100 and connects to other display connector using a plurality of connection cables 104.

The power source 100 may be a mobile or standby electric generators, or a battery system, while the controller 102 may be a switch to control power to and from the power source 100 to the light source 62.

In alternative embodiment, the power source 100 may be a battery or photovoltaic cell In the shown embodiment, each connection cable 104 is an insulated wire having a conductor to transfer electricity from the power source 100 to the light source 62. Each connection cable 104 includes a transmission connector 106 that connects to an end of the conductor to the power supply connector 96. In the shown embodiment, each transmission connector 106 is a plug that is received by the power supply connector 96 and includes a terminal receiving passageway 108 to receive the terminal of the power supply connector 96. However, one skilled in the art should appreciate that other designs are possible, including other variations of plug and receptacle or other connectors, including optical fiber connectors.

With reference to 7-9, another power supply assembly 200 will be described. The power supply assembly 200 includes many of the same elements as those shown the power supply assembly of FIGS. 1-6, and therefore same reference numerals and explanation thereof may be omitted. In fact, the power supply assembly 200 has the same basic configuration as that of the power supply assembly 80 shown in FIGS. 1-6, but includes different power supply connectors 202

Figure 7:
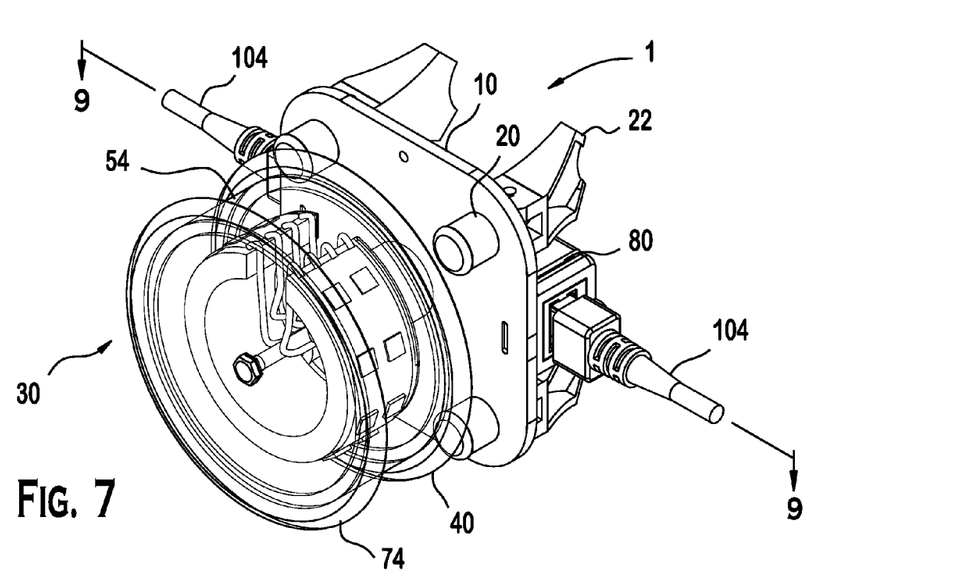
FIG. 7 is a perspective view of another display connector according to the invention.
Figure 8:
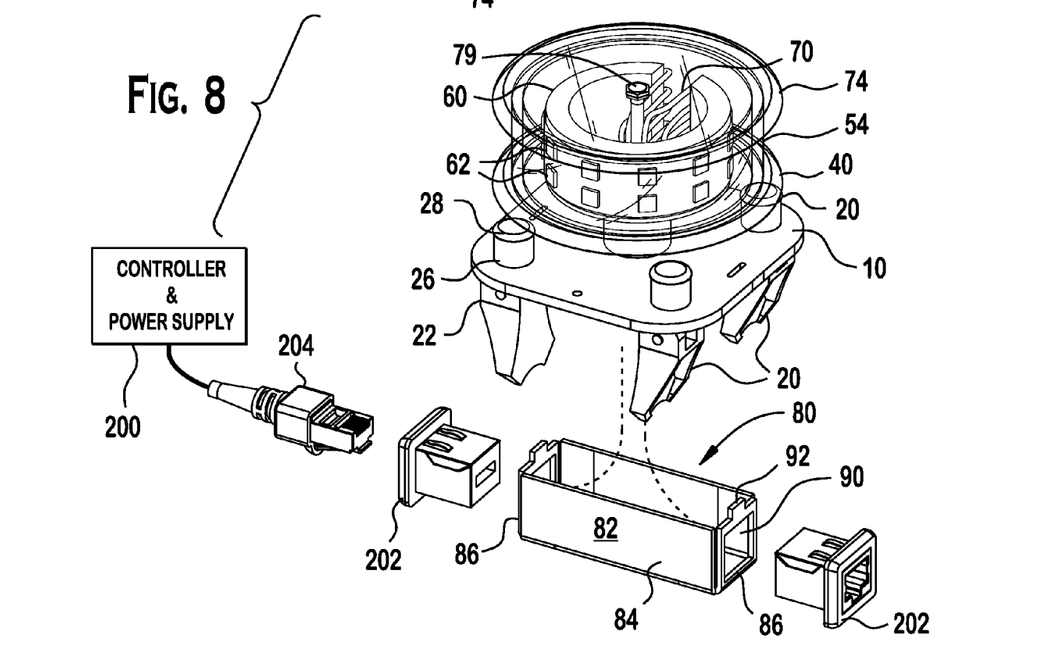
FIG. 8 is an exploded perspective view of the display connector of FIG. 7.
Figure 9:
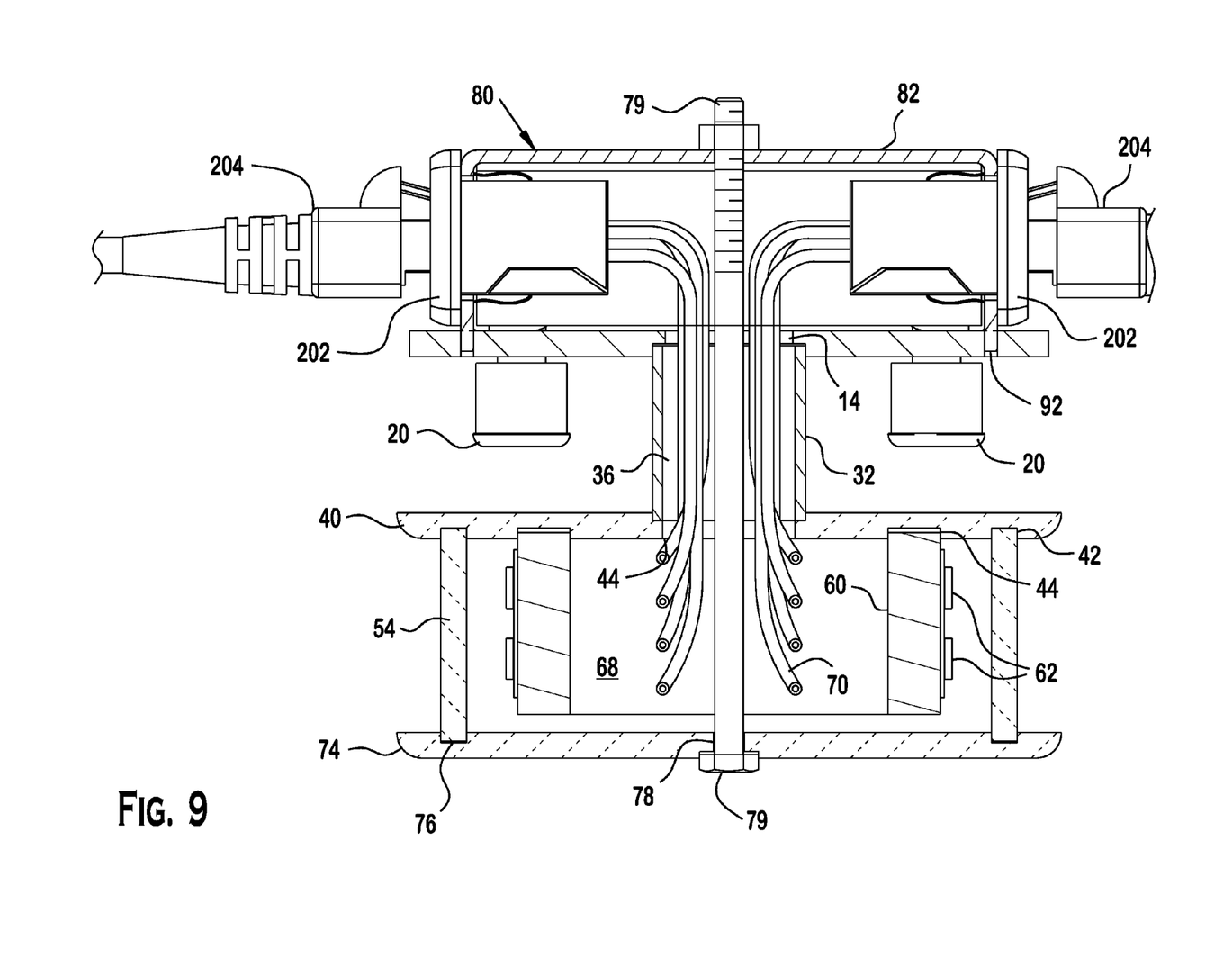
FIG. 9 is a sectional view of the display connector of FIG. 7, taken along line 7-7.

In the shown embodiment, the plurality of power supply connectors 202 are plug and/or receptacles having terminals connectable with the plurality of conductors or optical fibers 70, such as CAT 5 receptacles. Each power supply connector 202 is positioned at opposite ends of the connection box 82 and, in particular, each power supply connector 202 is disposed in the plurality of connector receiving spaces 90. Each power supply connector 96 includes a set of terminals 202 for connecting with a CAT 5 cable.

Accordingly, as shown in FIGS. 8 and 9, a plurality of connection cables 204 are provided to connect with the power supply connector 202. Each connection cable 204 is a CAT 5 cable in the shown embodiment. Since a CAT 5 cable can provide up to 25 watts of power in addition to Ethernet data, the connector can receive data and power for the light source 62. Therefore, the light source 62 can be controlled by both power and data instruction provided by the connection cable 204. Alternatively, the power source 100 may be a computer system that controls data and power to the light source 62.

Now with reference to FIGS. 1-4, assembly of the display connector 1 according to an embodiment of the invention will be discussed.

The extender 32 is positioned on the plate body 10 and, in particular, about the display assembly receiving passageway 14. If the extender 32 includes an attachment mechanism disposed at one or both ends of the extension walls 34, then the extender 32 attaches to the plate body. Next, the base 40 is positioned on top of the extender 32 and the and the support wall 56 is positioned on the base 40. The light source assembly is 60 is positioned in the support wall 56 and the plurality of conductors or optical fibers 70 are positioned through the wire receiving passageway 52 of the base 40 and the wire receiving passageway 36 of the extender 32. The plurality of conductors or optical fibers 70 also pass through the display assembly receiving passageway 14 of the plate body 10. Next, the lid 74 is positioned over the light source assembly 60 and the support wall 56. The fastener 79 may be used to secure the lid 74. The plurality of conductors or optical fibers 70 connect to the power supply connectors 96 that are then secured in the connector receiving spaces 90 of the connection box 82. Then, the power supply assembly 80 is secured to the plate body 10.

Now with reference to FIG. 5-6, assembly of the display connector 1 according to an embodiment of the invention with a modular panel 4 will be discussed As shown, each modular panel 4 is a shaped article. The modular panel 4 in the shown embodiment includes a thin squared panel body and a plurality of fastener receiving passageways 6. The panel body is made from textured material, but could be prepared from a variety of display materials, such as fiberboard, paper, plastic, wood, metal or other material that fits requirements of a particular use. One skilled in the art would appreciate that the shape, size and texture of the modular panel 4 can be modified and designed for a particular use.

Figure 5:
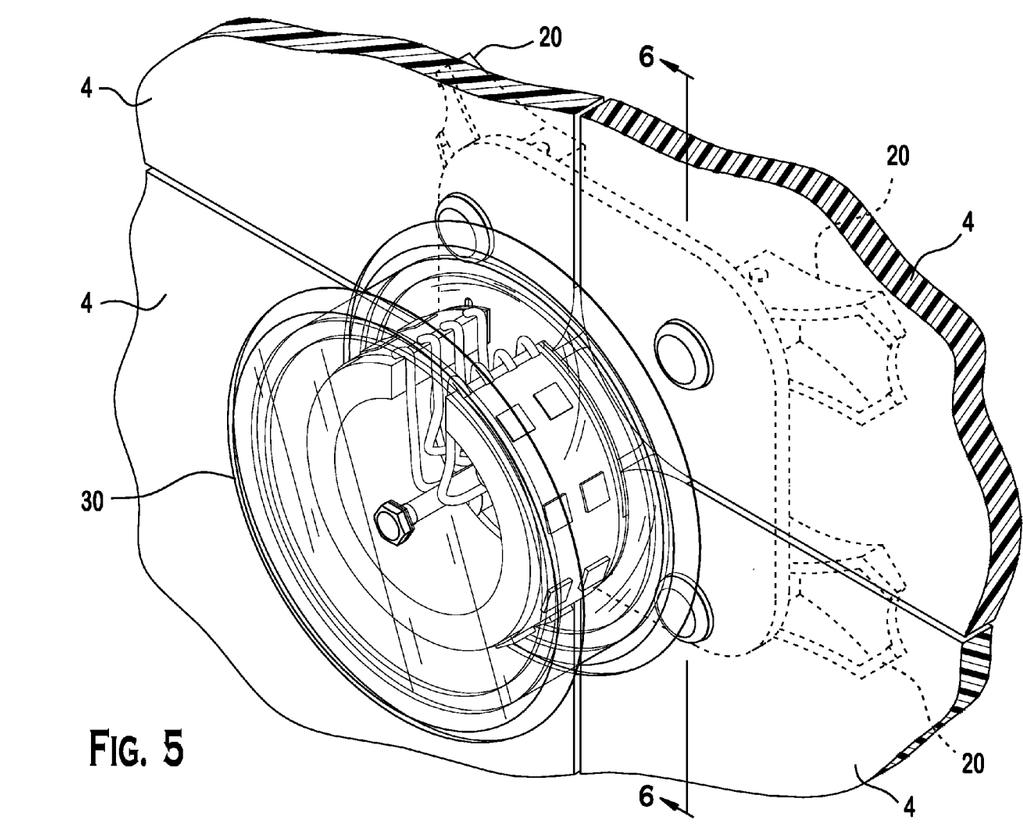
FIG. 5 is another perspective view of the display connector of FIG. 1, shown connected with a plurality of modular panels.
Figure 6:
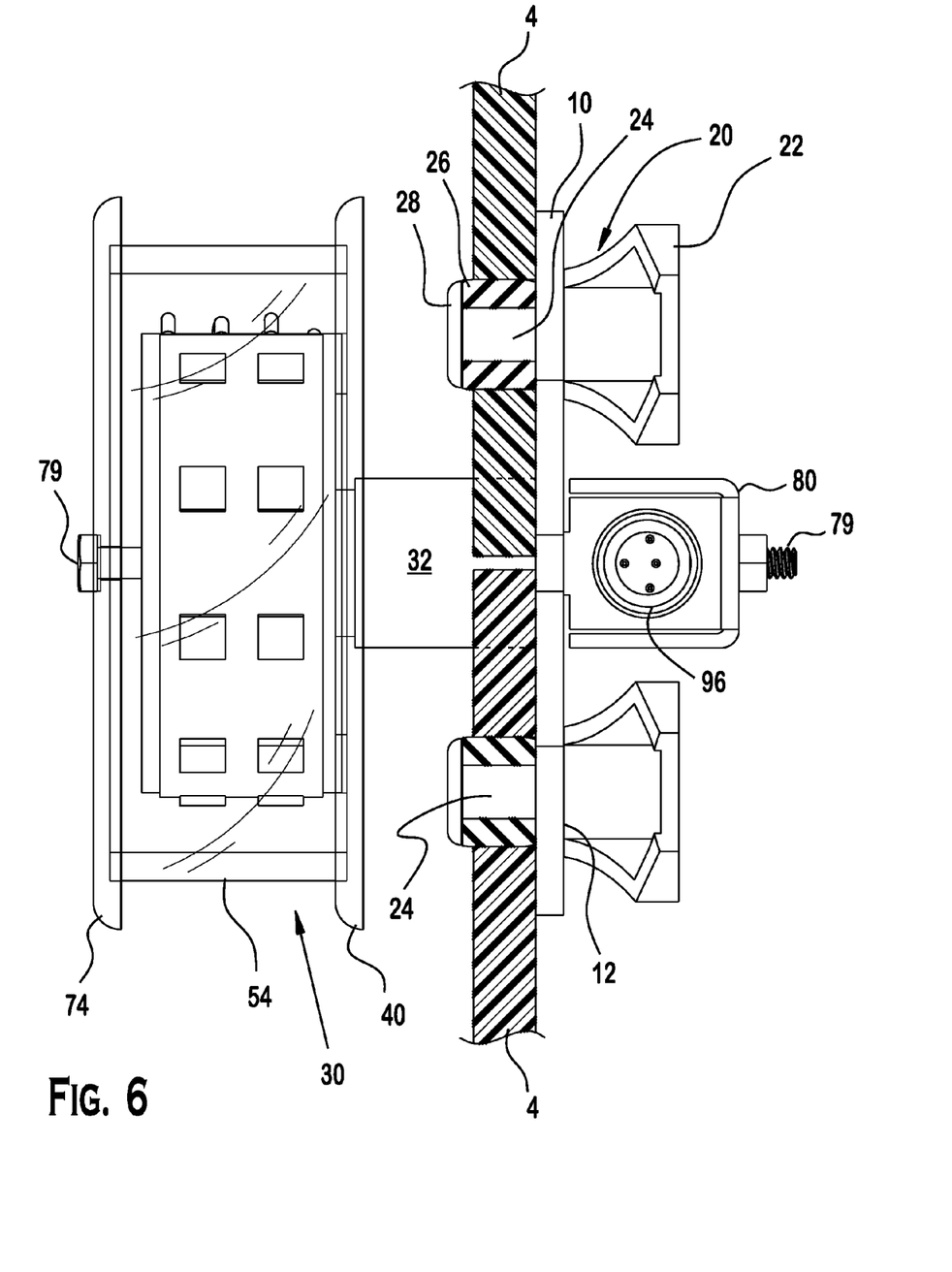
FIG. 6 is a sectional view of the display connector of FIG. 5, taken along line 5-5.

As shown in FIG. 5-6, each modular panel 4 connects to the display connector 1 using the fasteners 20. In the embodiment shown, the screw 24 passes through of one of the plurality of fastener receiving through holes 12 of the plate body 10, the fastener receiving passageway 6 of the modular panel 4, and the rubber washer 26. The screw 24 then engages with the nut 28. The lever 22 is positioned opened (i.e. parallel to the screw 24) and then used to tighten the screw 24 and the nut 28 together, which compresses the rubber washer 26 there between. The modular panel 4 is then pressed against a surface of the plate body 10, with the rubber washer 26 and nut 28 passing through the fastener receiving passageways 6.

In the embodiments shown in FIGS. 7-9, the plurality of connection cables 204 are connected with the power supply connector 202. One connection cable 204 attaches to a computer system and provides power in addition to Ethernet data. Therefore, the light source 62 can be controlled by both power and data instruction provided by the connection cable 204. Alternatively, the power source 100 may be a computer system that controls data and power to the light source 62. Another connection cable 204 connects to another power supply connector 202 on an opposite side of the power supply assembly 200. The other connection cable 204 connects to another display connector.

The foregoing illustrates some of the possibilities for practicing the invention. Many other embodiments are possible within the scope and spirit of the invention. The disclosed invention utilizes the above identified components, as a system, in order to more efficiently construct a display system 1 for a particular purpose. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A display connector comprising:
a plate body having a panel fastener;
a display assembly positioned on the plate body and having:
a light housing with a light source positioned in the light housing, and
an extender positioned between the light housing and the plate body; and
a power source connecting to the light source through the plate body.

2. The display connector according to claim 1, wherein the plate body includes a display assembly receiving passageway extending through the plate body.

3. The display connector according to claim 2, wherein the display assembly receiving passageway includes an engagement wall with a flange positioned along one end of the engagement wall.

4. The display connector according to claim 1, wherein each panel fastener is a swell latch.

5. The display connector according to claim 1, wherein the display assembly includes a light source assembly positioned in the light housing.

6. The display connector according to claim 5, wherein the extender is an elongated body having an extension wall and a wire receiving passageway extending between the extension walls.

7. The display connector according to claim 5, wherein the light housing includes a base and a support wall disposed on the base.

8. The display connector according to claim 7, wherein the base includes a support wall receiving section positioned on a top surface of the base.

9. The display connector according to claim 8, wherein the base further includes a light source receiving groove positioned on the top surface of the base and within the support wall receiving section.

10. The display connector according to claim 7, wherein the base includes an extender receiving space disposed along a bottom surface thereof.

11. The display connector according to claim 10, wherein the extender receiving space includes an engagement wall and a flange positioned along an end of the engagement wall.

12. The display connector according to claim 7, wherein the support wall is an elongated tubular body having a translucent wall and a display assembly receiving space inside the translucent wall.

13. The display connector according to claim 5, wherein the light housing includes a mounting wall supporting the light source.

14. The display connector according to claim 1, wherein the light source is an array of light emitting diodes (LEDs).

15. The display connector according to claim 1, further comprising a power supply assembly disposed along a lower surface of the plate body.

16. The display connector according to claim 15, wherein the power supply assembly includes a connection box and a plurality of power supply connectors.

17. The display connector according to claim 16, wherein the connection box is a housing having a plurality of support walls positioned at opposite thereof and a plurality of connector receiving spaces positioned in the plurality of support walls.

18. The display connector according to claim 17, wherein the connection box further includes a body attachment mechanism secured to the plate body.

19. The display connector according to claim 17, wherein the plurality of power supply connectors include terminals connectable with a plurality of conductors or optical fibers connected to the light source.

20. The display connector according to claim 5, wherein the light source assembly includes a mounting wall with a light source receiving passageway to receive the light source.

21. A display connector comprising:
a plate body having a panel fastener;
a display assembly positioned on the plate body and having:
a light housing with a light source positioned in the light housing, and
an extender positioned between the light housing and the plate body; and
a signal carrying cable connector connected to the light source and extending through the plate body.

22. The display connector according to claim 20, wherein the mounting wall is a tubular member having a wire receiving space extending though a middle thereof.

23. The display connector according to claim 22, wherein the light source receiving passageway is positioned along an outer surface of the mounting wall.

* * * * *